(No Model.)
J. C. F. HURST.
VEHICLE BRAKE.
No. 521,588. Patented June 19, 1894.
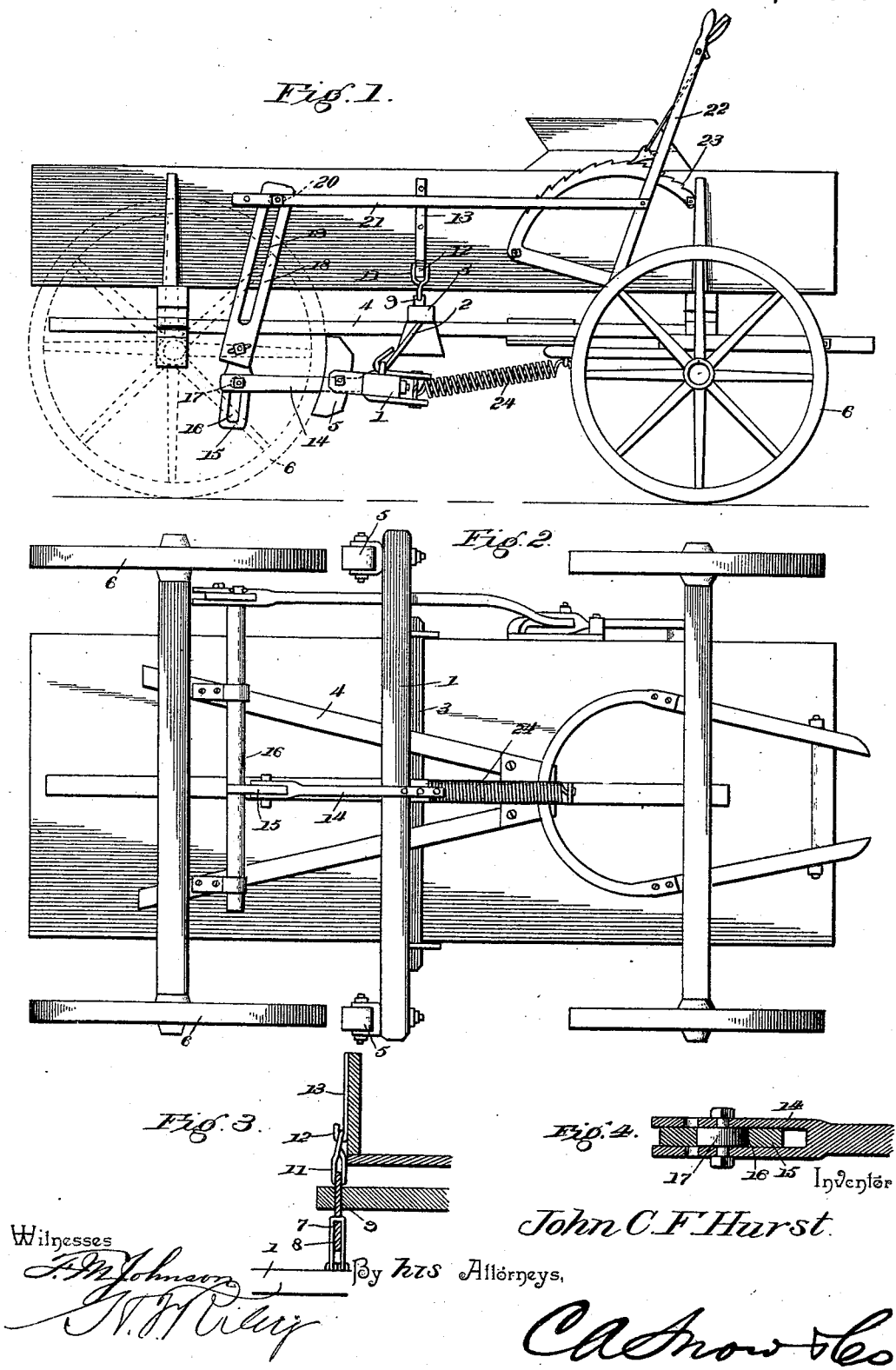
Witnesses
F. M. Johnson
N. F. Riley
Inventor
John C. F. Hurst
By his Attorneys,
C. A. Snow & Co.
THE NATIONAL LITHOGRAPHING COMPANY,
WASHINGTON, D. C.

UNITED STATES PATENT OFFICE.

JOHN C. F. HURST, OF HOLTON, KANSAS.

VEHICLE-BRAKE.

SPECIFICATION forming part of Letters Patent No. 521,588, dated June 19, 1894.

Application filed October 26, 1893. Serial No. 489,176. (No model.)

*To all whom it may concern:*

Be it known that I, JOHN C. F. HURST, a citizen of the United States, residing at Holton, in the county of Jackson and State of Kansas, have invented a new and useful Vehicle-Brake, of which the following is a specification.

The invention relates to improvements in vehicle brakes.

The object of the present invention is to improve the construction of wagon brakes, and to provide a simple and effective one, which may be applied with great force, and which when not applied will have its brake shoes arranged a sufficient distance from the wheels to prevent clogging from accumulation of mud.

The invention consists in the construction and novel combination and arrangement of parts hereinafter fully described, illustrated in the accompanying drawings and pointed out in the claim hereto appended.

In the drawings—Figure 1 is a side elevation of a wagon provided with a brake constructed in accordance with this invention, and shown applied. Fig. 2 is a reverse plan view, the brake being off the wheels. Fig. 3 is a detail sectional view, showing the manner of supporting the transverse and brake bars. Fig. 4 is a detail sectional view showing the connection between the rock-shaft and brake-bar.

Like numerals of reference indicate corresponding parts in all the figures of the drawings.

1 designates a brake-bar, suspended by links 2 from a transverse bar 3, which is secured upon the upper faces of the rear hounds 4 of the running gear of a vehicle; and the said brake-bar is provided at its end with brake shoes 5, arranged in advance of and adapted to engage the hind-wheels 6 of the vehicle. Each link 2 is approximately U-shaped, and its upper end is arranged in a perforation 7 of a plate 8, which depends from the transverse bar 3, and which has its lower portion received in the crotch of the link and serves as a guide for the link, to prevent any longitudinal movement of the brake-bar, and to cause the brake shoes to clamp the hind wheels squarely without any liability of slipping off of them at either side. The lower ends of the sides of the link are provided with eyes to engage eyes of the brake-bar. The plate 8 has its lower portion tapering, and it is provided at its top with a shank 9, extending through and projecting above the transverse bar, and provided with a perforation, which is arranged above the transverse bar, and into which is linked a lower loop of a link 11. The link 11 is provided with upper and lower loops arranged at right angles to each other; and the upper loop engages a hook 12 of a supporting bar or iron 13. When the brake is not applied the brake bar is arranged below the transverse bar, and the two bars are adapted to serve as steps to enable a person to enter readily the vehicle. The link 11 and its connections with the body of the vehicle and the transverse bar enables the brake-bar to be used as a step without liability of the same being injured by such use.

The brake-bar is centrally secured in a fork or bifurcation of a rearwardly extending connecting bar 14, which has its rear end forked or bifurcated and loosely connected by a pivot bolt with an arm 15 of a rock-shaft 16. The arm 15 depends from the rock-shaft and is provided with a longitudinal opening 16 to receive an anti-friction roller 17, which is arranged on the pivot bolt that connects the bar 14 with the arm 15. The rock-shaft is provided at one end with an upward extending arm 18 having a longitudinal opening or slot 19 to receive an anti-friction roller 20 of a connecting bar 21, which has its front end adjustably secured to an operating lever 22. The operating lever is provided with a latch, which engages a curved ratchet 23 for securing the brake at the desired tension. When the brake is not applied the shoes are held a considerable distance away from the wheels by a spiral spring 24 to prevent accumulation of mud, and to avoid any liability of the vehicle becoming clogged. The spiral spring has its front end connected with the running gear and its rear end is attached to the front end of the connecting bar 14.

It will be seen that the brake is simple and comparatively inexpensive in construction, that it is capable of being applied with great force, and that when not applied the brake shoes are located a sufficient distance from the wheels to prevent the accumulation of mud. It will also be apparent that the brake-bar is adapted to serve as a step to enable a person to enter the vehicle readily, and that the brake bar is securely supported while serving as a step.

Changes in the form, proportion and the minor details of construction may be resorted to without departing from the principle or sacrificing any of the advantages of this invention.

What I claim is—

In a brake, the combination with a vehicle, of a transverse bar secured to and supported by the running gear thereof, depending guide plates provided with perforations and having shanks extending through the transverse bar and provided with perforations, supporting irons secured to the body of the vehicle and provided with hooks connected with the shanks for links engaging the perforations of the shanks, a brake-bar provided with brake shoes, the approximately U-shaped links receiving the lower portions of the guide plates and arranged in the perforations thereof and having their lower ends hingedly connected with the brake-bar, and means for operating the brake-bar, substantially as described.

In testimony that I claim the foregoing as my own I have hereto affixed my signature in the presence of two witnesses.

JOHN C. F. HURST.

Witnesses:
GEO. H. PARKER,
ALEX. DUNN, Jr.